(12) United States Patent
Sandberg et al.

(10) Patent No.: US 10,332,560 B2
(45) Date of Patent: Jun. 25, 2019

(54) AUDIO-VIDEO COMPOSITING AND EFFECTS

(71) Applicant: Yoostar Entertainment Group, Inc., New York, NY (US)

(72) Inventors: Berta Sandberg, Los Angeles, CA (US); John C. Schultz, Beverly Hills, CA (US)

(73) Assignee: Noo Inc., New York, NY (US)

( * ) Notice: Subject to any disclaimer, the term of this patent is extended or adjusted under 35 U.S.C. 154(b) by 0 days.

(21) Appl. No.: 14/265,131

(22) Filed: Apr. 29, 2014

(65) Prior Publication Data

US 2014/0328574 A1    Nov. 6, 2014

Related U.S. Application Data

(60) Provisional application No. 61/819,777, filed on May 6, 2013.

(51) Int. Cl.
    *G11B 27/036*    (2006.01)
    *G11B 27/034*    (2006.01)

(52) U.S. Cl.
    CPC .......... *G11B 27/036* (2013.01); *G11B 27/034* (2013.01)

(58) Field of Classification Search
    CPC ............................. G11B 27/036; G11B 27/034
    USPC ........................................................ 386/280
    See application file for complete search history.

(56) References Cited

U.S. PATENT DOCUMENTS

| | | |
|---|---|---|
| 4,122,490 A | 10/1978 | Lish |
| 4,357,624 A | 11/1982 | Greenberg |
| 4,521,014 A | 6/1985 | Sitrick |
| 4,599,611 A | 7/1986 | Bowker et al. |
| 4,688,105 A | 8/1987 | Bloch et al. |
| 4,710,873 A | 12/1987 | Breslow et al. |
| 4,800,432 A | 1/1989 | Barnett et al. |
| 4,827,344 A | 5/1989 | Astle et al. |
| 4,891,748 A | 1/1990 | Mann |
| 4,968,132 A | 11/1990 | Ferren |
| 5,099,337 A | 3/1992 | Cury |
| 5,144,454 A | 9/1992 | Cury |
| 5,151,793 A | 9/1992 | Ito et al. |
| 5,184,295 A | 2/1993 | Mann |
| 5,249,967 A | 10/1993 | O'Leary et al. |

(Continued)

FOREIGN PATENT DOCUMENTS

| | | |
|---|---|---|
| EP | 0 867 839 A2 | 9/1998 |
| EP | 2124438 A1 | 11/2009 |
| JP | 60-190078 | 9/1985 |
| JP | 63-178677 | 7/1988 |

(Continued)

OTHER PUBLICATIONS

International Search Report and Written Opinion dated Sep. 5, 2014, in connection with International Application No. PCT/US2014/035941 (10 pages).

(Continued)

*Primary Examiner* — Thai Q Tran
*Assistant Examiner* — Nien-Ru Yang
(74) *Attorney, Agent, or Firm* — Venable LLP

(57) ABSTRACT

Systems, apparatuses, methods, and computer program products perform image and audio processing in a real-time environment, in which an overlay alpha-channel video is composited onto a camera stream received from a capture device, and in which an audio stream from a capture device is mixed with audio data are output to a storage file.

26 Claims, 4 Drawing Sheets

(56) References Cited

U.S. PATENT DOCUMENTS

| | | | |
|---|---|---|---|
| 5,264,933 A | 11/1993 | Rosser et al. |
| 5,381,184 A | 1/1995 | Gehrmann |
| 5,428,401 A | 6/1995 | Hinson |
| 5,500,684 A | 3/1996 | Uya |
| 5,553,864 A | 9/1996 | Sitrick |
| 5,566,251 A | 10/1996 | Hanna et al. |
| 5,681,223 A | 10/1997 | Weinreich |
| 5,751,337 A | 5/1998 | Allen et al. |
| 5,764,306 A | 6/1998 | Steffano |
| 5,830,065 A | 11/1998 | Sitrick |
| 5,861,881 A | 1/1999 | Freeman et al. |
| 5,953,076 A | 9/1999 | Astle et al. |
| 5,982,350 A | 11/1999 | Hekmatpour et al. |
| 5,995,671 A | 11/1999 | Nagarajan et al. |
| 6,061,532 A | 5/2000 | Bell |
| 6,072,537 A | 6/2000 | Gurner et al. |
| 6,072,933 A | 6/2000 | Green |
| 6,086,380 A | 7/2000 | Chu et al. |
| 6,122,013 A | 9/2000 | Tamir et al. |
| 6,126,449 A | 10/2000 | Burns |
| 6,198,503 B1 | 3/2001 | Weinreich |
| 6,283,858 B1 | 9/2001 | Hayes, Jr. et al. |
| 6,285,408 B1 | 9/2001 | Choi et al. |
| 6,335,765 B1 | 1/2002 | Daly et al. |
| 6,350,199 B1 | 2/2002 | Williams et al. |
| 6,351,265 B1 | 2/2002 | Bulman |
| 6,384,821 B1 | 5/2002 | Borrel et al. |
| 6,425,825 B1 | 7/2002 | Sitrick |
| 6,476,874 B1 | 11/2002 | Ito et al. |
| 6,522,787 B1 | 2/2003 | Kumar et al. |
| 6,535,269 B2 | 3/2003 | Sherman et al. |
| 6,624,853 B1 | 9/2003 | Latypov |
| 6,750,919 B1 | 6/2004 | Rosser |
| 6,816,159 B2 | 11/2004 | Solazzi |
| 6,835,887 B2 | 12/2004 | Devecka |
| 6,881,067 B2 | 4/2005 | Tarry |
| 6,919,892 B1 | 7/2005 | Cheiky et al. |
| 6,937,295 B2 | 8/2005 | Islam et al. |
| 6,954,498 B1 | 10/2005 | Lipton |
| 7,015,978 B2 | 3/2006 | Jeffers et al. |
| 7,027,054 B1 | 4/2006 | Cheiky et al. |
| 7,034,537 B2 | 4/2006 | Tsuda et al. |
| 7,079,176 B1 | 7/2006 | Freeman et al. |
| 7,106,906 B2 | 9/2006 | Iwamura |
| 7,137,892 B2 | 11/2006 | Sitrick |
| 7,181,081 B2 | 2/2007 | Sandrew |
| 7,209,181 B2 | 4/2007 | Kriegman |
| 7,221,395 B2 | 5/2007 | Kinjo |
| 7,230,653 B1 | 6/2007 | Overton et al. |
| 7,268,834 B2 | 9/2007 | Lundberg et al. |
| 7,285,047 B2 | 10/2007 | Gelb et al. |
| 7,319,493 B2 | 1/2008 | Hata et al. |
| 7,324,166 B1 | 1/2008 | Joslin et al. |
| 7,400,752 B2 | 7/2008 | Zacharias |
| 7,495,689 B2 | 2/2009 | Curtis et al. |
| 7,528,890 B2 | 5/2009 | Staker et al. |
| 7,559,841 B2 | 7/2009 | Hashimoto |
| 7,613,350 B2 | 11/2009 | Iwamura |
| 7,616,264 B1 | 11/2009 | Greenberg |
| 7,626,617 B2 | 12/2009 | Terada |
| 7,646,434 B2 | 1/2010 | Staker et al. |
| 7,649,571 B2 | 1/2010 | Staker et al. |
| 7,675,520 B2 | 3/2010 | Gee et al. |
| 7,716,604 B2 | 5/2010 | Kataoka et al. |
| 7,720,283 B2 | 5/2010 | Sun et al. |
| 7,752,648 B2 | 7/2010 | Shelton et al. |
| 7,780,450 B2 | 8/2010 | Tarry |
| 7,827,488 B2 | 11/2010 | Sitrick |
| 7,867,086 B2 | 1/2011 | Sitrick |
| 2002/0007718 A1 | 1/2002 | Corset |
| 2002/0051009 A1 | 5/2002 | Ida et al. |
| 2002/0130889 A1 | 9/2002 | Blythe et al. |
| 2003/0051255 A1 | 3/2003 | Bulman et al. |
| 2003/0108329 A1 | 6/2003 | Adriansen et al. |
| 2003/0148811 A1 | 8/2003 | Sitrick |
| 2004/0100581 A1 | 5/2004 | Williams |
| 2004/0152058 A1 | 8/2004 | Browne et al. |
| 2004/0202382 A1 | 10/2004 | Pilu |
| 2004/0218100 A1 | 11/2004 | Staker et al. |
| 2005/0028193 A1 | 2/2005 | Candelore et al. |
| 2005/0151743 A1 | 7/2005 | Sitrick |
| 2005/0155086 A1 | 7/2005 | Schick et al. |
| 2005/0204287 A1* | 9/2005 | Wang ............... H04N 21/47205 715/716 |
| 2005/0215319 A1 | 9/2005 | Rigopulos et al. |
| 2006/0136979 A1 | 6/2006 | Staker et al. |
| 2006/0262696 A1 | 11/2006 | Woerlee |
| 2007/0064120 A1 | 3/2007 | Didow et al. |
| 2007/0064125 A1 | 3/2007 | Didow et al. |
| 2007/0064126 A1 | 3/2007 | Didow et al. |
| 2007/0107015 A1 | 5/2007 | Kazama et al. |
| 2007/0122786 A1 | 5/2007 | Relan et al. |
| 2007/0189737 A1 | 8/2007 | Chaudhri et al. |
| 2008/0085766 A1 | 4/2008 | Sitrick |
| 2008/0195638 A1 | 8/2008 | Winberry et al. |
| 2009/0015679 A1 | 1/2009 | Hayakawa et al. |
| 2009/0040385 A1 | 2/2009 | Staker et al. |
| 2009/0041422 A1* | 2/2009 | Staker ..................... H04N 9/75 386/353 |
| 2009/0059094 A1 | 3/2009 | Yi et al. |
| 2009/0163262 A1 | 6/2009 | Kang |
| 2009/0199078 A1 | 8/2009 | Caspi et al. |
| 2009/0202114 A1 | 8/2009 | Morin et al. |
| 2009/0208181 A1 | 8/2009 | Cottrell |
| 2009/0237564 A1 | 9/2009 | Kikinis et al. |
| 2009/0271821 A1 | 10/2009 | Zalewski |
| 2009/0280897 A1 | 11/2009 | Fitzmaurice et al. |
| 2009/0324191 A1 | 12/2009 | Reusens et al. |
| 2010/0027961 A1* | 2/2010 | Gentile ..................... G06T 5/50 386/278 |
| 2010/0171848 A1 | 7/2010 | Peters et al. |
| 2011/0188836 A1* | 8/2011 | Popkiewicz ........... G06Q 30/02 386/278 |
| 2013/0060899 A1* | 3/2013 | Mao ....................... H03M 7/30 709/217 |
| 2013/0216206 A1* | 8/2013 | Dubin ..................... H04N 7/155 386/282 |

FOREIGN PATENT DOCUMENTS

| | | |
|---|---|---|
| JP | 01-228288 | 9/1989 |
| JP | 02-127886 | 5/1990 |
| JP | 03-261279 | 11/1991 |
| JP | 04-220885 | 8/1992 |
| JP | 05-014810 | 1/1993 |
| JP | 05-284522 | 10/1993 |
| JP | 09-219836 | 8/1997 |
| JP | 11-069228 | 3/1999 |
| JP | 11-252459 | 9/1999 |
| JP | 2000-209500 | 7/2000 |
| JP | 2002-077726 | 3/2002 |
| JP | 2002-232783 | 8/2002 |
| JP | 2002-281465 | 9/2002 |
| JP | 2004-501576 | 1/2004 |
| WO | WO 93/06691 | 4/1993 |
| WO | WO 99/26160 | 5/1999 |
| WO | WO 01/63560 A1 | 8/2001 |
| WO | WO 01/99413 A2 | 12/2001 |
| WO | WO 02/071763 A1 | 9/2002 |
| WO | WO 2004/040576 A1 | 5/2004 |
| WO | WO 2005/076618 A1 | 8/2005 |
| WO | WO 2006/135358 A1 | 12/2006 |
| WO | WO 2007/035558 A2 | 3/2007 |
| WO | WO 2007/071954 A1 | 6/2007 |
| WO | WO 2009/079560 A1 | 6/2009 |
| WO | WO 2010/002921 A1 | 1/2010 |
| WO | WO 2012/166305 A1 | 12/2012 |

OTHER PUBLICATIONS

A.J. Schofield et al., "A System for Counting People in Video Images using Neural Networks to Identify the Background Scene",

(56) References Cited

OTHER PUBLICATIONS

Pattern Recognition, vol. 29, No. 8, pp. 1421-1428, Elsevier Science Ltd., Great Britain, 1996.
Franco Caroti Ghelli, "A Sequential Learning Method for Boundary Detection", Pattern Recognition, vol. 21, No. 2, pp. 131-139, Great Britain, 1988.
G.Y. Georgiannakis et al., "Design of an Immersive Teleconferencing Application", Institute of Computer Science, FORTH and Department of Computer Science, University of Crete, Dated 1996, 14 pages.
Nikhil R. Pal et al., "A Review on Image Segmentation Techniques", Pattern Recognition, vol. 26, No. 9, pp. 1277-1294, Great Britain, 1993.
R. Braham, "The Digital Backlot", IEEE Spectrum, vol. 32, Issue 7, pp. 51-63, Jul. 1995.
PCT International Search Report and Written Opinion of the International Searching Authority for International Patent Application No. PCT/US2009/049303, dated Dec. 7, 2009, 22 pages.
S. Alliney et al., "On Registration of an Object Translating on a Static Background", Pattern Recognition, vol. 29, No. 1, pp. 131-141, Elsevier Science Ltd., Great Britain, 1996.
Til Aach et al., "Disparity-Based Segmentation of Stereoscopic Foreground/Background Image Sequences", IEEE Transactions on Communications, vol. 42, No. 2/3/4; pp. 673-679, 1994.
PCT International Search Report and Written Opinion of the International Searching Authority for International Patent Application No. PCT/US2012/036937, dated Sep. 10, 2012, 10 pages.
R. Gvili et al., "Depth Keying", Proc. of SPIE-IS&T Electronic Imaging, vol. 5006, Jan. 1, 2003, pp. 564-574.
R. Crabb et al., "Real-time Foreground Segmentation via Range and Color Imaging", Computer Vision and Pattern Recognition Workshops, CVPR Workshops 2008, IEEE Computer Society Conf., NJ, USA, Jun. 23, 2008, pp. 1-5.
B. Huhle et al., "Robust Non-Local Denoising of Colored Depth Data", Computer Vision and Pattern Recognition Workshops, CVPR Workshops 2008, IEEE Computer Society Conf., NJ, USA, Jun. 23, 2008, pp. 1-7.
I. Schiller et al., "Improved Video Segmentation by Adaptive Combination of Depth Keying and Mixture-of-Gaussians", Proc. SCIA, Springer Berlin Heidelberg, LNCS 6688, Jan. 1, 2011, pp. 59-68.
"Median Filters", http://pixinsight.com/doc/legacy/le/19_morphological/median_filter/median_filter.html, Pleiades Astrophoto, 2004.
A. François, "Semantic, Interactive Manipulation of Visual Data", Ph.D. dissertation / IRIS Technical Report IRIS-01-409, University of Southern California, Los Angeles, Dec. 2000.
M. Kass et al., "Snakes—Active Contour Models", International Journal of Computer Vision, 1(4): 321-331 (1987).
E. Mortensen et al., "Intelligent scissors for image composition", In: SIGGRAPH '95: Proceedings of the 22nd annual conference on Computer graphics and interactive techniques, New York, NY, USA: ACM Press, pp. 191-198, 1995.
Y. Boykov, et al.,"Interactive graph cuts for optimal boundary & region segmentation of objects in n-d images", in International Conference on Computer Vision, 2001.
"8.8 White Balance", http://docs.gimp.org/en/gimp-layer-white-balance.html, Version 1.2, Dec. 2000.
"Histogram Equalization", http://fourier.eng.hmc.edu/e161/lectures/contrast_transform/node3.html, Sep. 2009.
Microsoft Research, "Kinect for Windows SDK Beta Programming Guide", pp. 1-34, Jul. 2011.
E. Young, et al., "Image Processing & Video Algorithms With CUDA", in NVISION08, 2008.

\* cited by examiner

AUDIO-VIDEO COMPOSITING AND EFFECTS

CROSS-REFERENCE TO RELATED APPLICATION

The present application claims priority to U.S. Provisional Application No. 61/819,777, filed on May 6, 2013, the entire contents of which are hereby incorporated by reference as if set forth fully herein.

BACKGROUND

Field

Example aspects of the present invention generally relate to image and audio processing, and more particularly to audio-video compositing for captured data of a scene for social sharing.

Related Art

Cameras and microphones for desktops, laptops, and mobile devices are commonly used to capture user data for the purpose of social sharing. Digital entertainment products (e.g., JibJab) allow users to insert a still image of their face into a scene which is animated and then shared. Mobile video sharing applications (e.g., Viddy®) allow users to record themselves with video effects and share the result. Applications, such as Action Movie FX®, use special effect overlays to combine a live video stream with special effects, thereby allowing users to incorporate special effects into user-created videos.

BRIEF DESCRIPTION

The example embodiments described herein provide systems, apparatuses, methods, and computer program products for audio-video compositing. In one example embodiment, the method comprises recording and compositing a first video track of an overlay alpha video and a second video track of a video stream and an audio track, and playing back the first and second video tracks and the audio track in real-time.

BRIEF DESCRIPTION OF THE DRAWINGS

The features and advantages of the example embodiments presented herein will become more apparent from the detailed description set forth below when taken in conjunction with the drawings.

DETAILED DESCRIPTION

I. Overview

Figure 1:
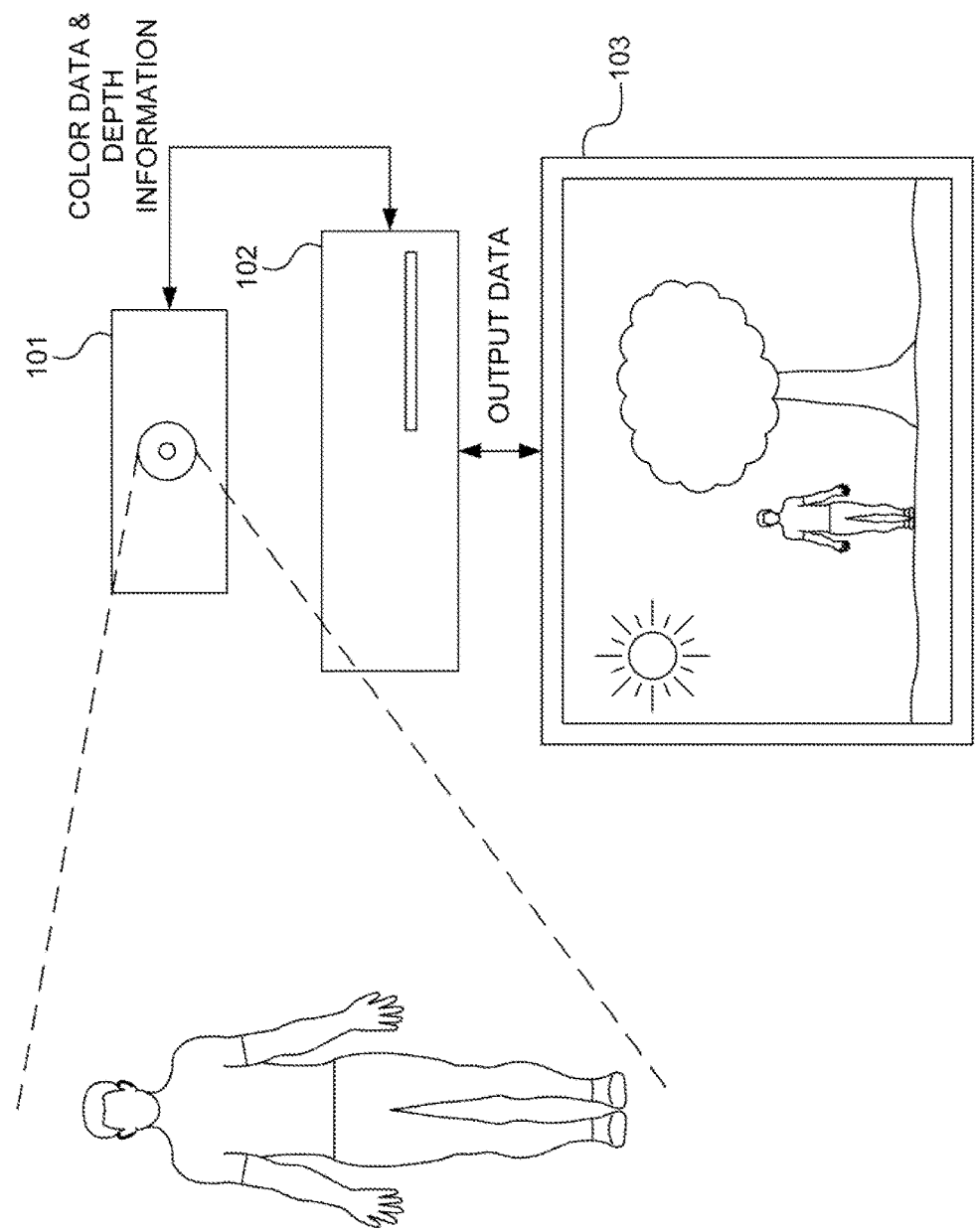
FIG. 1 is a representative view of an environment in which some example embodiments herein may be implemented.

The example embodiments presented herein are directed to apparatuses, methods, and computer program products for image processing in an environment using consumer devices. This description is not intended to limit the application of the example embodiments presented herein. In fact, after reading the following description, it will be apparent to one skilled in the relevant art(s) how to implement the following example embodiments in alternative environments, such as a services-based environment, a web services-based environment, and/or other environments.

According to one aspect, the example embodiments herein combine a video which provides an alpha channel (overlay) on top of a video stream (such as a live camera stream or pre-recorded video). The alpha channel information is used to create transparent regions and semi-transparent regions so that the user's video stream can be combined with the overlay. Different overlays provide users with different virtual experiences, allowing them to interact with the video in creative ways.

The overlay video may also include a soundtrack, which is mixed in with audio captured from a microphone. After the user records their performance, they can preview the performance to check their work. If they are happy with their work, the final video consisting of the recorded overlay alpha video and the recorded camera video, is composited, and the audio is mixed into a single file which can then be shared via email, social media (e.g., Facebook®, Twitter®), and/or by other means. The resulting video can be played back on a desktop personal computer, a laptop computer, a television, a mobile communication device, and/or any other type of computing device.

The following is a description of certain filters and corresponding video effects that may be provided in accordance with example embodiments herein:
  filters that improve a person's appearance such as gamma and color curves;
  filters, such as localized Gaussian blur filters and/or bilateral filters, that smooth skin and imperfections;
  filters that add film grain; and
  color filters that make people look like aliens/Halloween creatures, cartoon effects, vintage effects, movie looks, and/or the like.

The following is a description of certain audio effects that may be provided in accordance with example embodiments herein.
  pitch effects that raise the voice to sound like a cartoon character or lower the voice to sound like a monster;
  formant effects wherein the character of the user's voice is changed with or without changing the pitch;
  chorus, flange, vibrato, and/or tremolo effects;
  echo and/or reverb effects; and
  low pass and/or high pass filter effects.

In one example embodiment, a video feed is resized into a customized container, such as an airplane, a submarine with windows, a spaceship, and/or another type of container. The container can be animated and/or can move around while the live video plays inside the container.

In another example embodiment, face detection and/or custom compositing is performed, including the detection of facial features, such as eyeballs, mouth, and/or other facial features. Other example face detection and/or custom compositing techniques that may be provided in accordance with example embodiments herein include:
  masks that move with the player's face; and
  performing a textured face-replace (e.g., placing a celebrity's face over the user's face, where the eyes, eyebrows, and mouth move realistically).

According to one example embodiment herein, an interaction is provided between the overlay and the recording video wherein face detection and/or motion information are used to animate and/or change overlays in response to the recorded video.

In another example embodiment, a reaction is recorded wherein a video is sent to a viewer and the viewer's reaction to the video is recorded. The recorded reaction video can then be sent to the sender who can then view the reaction.

In yet a further example embodiment, a story chain video is passed from one person to the next, wherein each person adds their part of the story. The final video can be processed into a single video from all participant clips for social sharing.

Further features and advantages, as well as the structure and operation, of various example embodiments herein are described in detail below with reference to the accompanying drawings.

II. System

FIG. 1 is a representative view of an environment in which some embodiments of the invention may be implemented. As shown in FIG. 1, capture device 101 is connected with image processing device 102, which in turn is connected with display device 103. A user stands in the vicinity of a scene captured by capture device 101, and an image of the user is displayed on display device 103 along with other image data.

More specifically, capture device 101 is a device which may include hardware and/or software for capturing alpha information of a scene, as well as color data of a scene. For example, a color camera and/or CMOS sensor may capture color data such as YUV data, RGB data or data in other color spaces, whereas an infrared sensor or other alpha sensing technology may capture alpha information of the scene (e.g., where a player is standing in three dimensions in relation to other objects). The alpha information and color data may then be transferred to other devices for processing, such as image processing device 102.

Image processing device 102 is a device which processes the alpha information and color data output by capture device 101 in order to generate output for display on display device 103. In one example as shown in FIG. 1, image processing device 102 might use the alpha information and color data of the scene to generate a player image which is inserted into an output video scene on display device 103. Example pseudocode that, in some example embodiments, may be executed by image processing device 102 to implement alpha compositing using an overlay video and camera stream is provided below.

In FIG. 1, image processing device 102 is shown as a video game system console, although image processing device 102 could also be embodied as, for example, a desktop or laptop computer, a set-top box, or as part of display device 103, among many other embodiments.

Display device 103 outputs image and/or video data from image processing device 102, such as a display of the player combined with video data as shown in FIG. 1. In FIG. 1, display device 103 is depicted as a television, but display device 103 could be embodied as several other types of display devices, including a standalone monitor, a laptop screen, or a projection device, among others.

In that regard, while FIG. 1 depicts capture device 101, image processing device 102 and display device 103 as three separate devices, in other embodiments these devices might be combined into a single device or any other number of devices. Moreover, while capture device 101, image processing device 102 and display device 103 are shown in the same local area, these devices could also be located remotely from each other, and could communicate via a wired or wireless network.

III. Device

Figure 2:
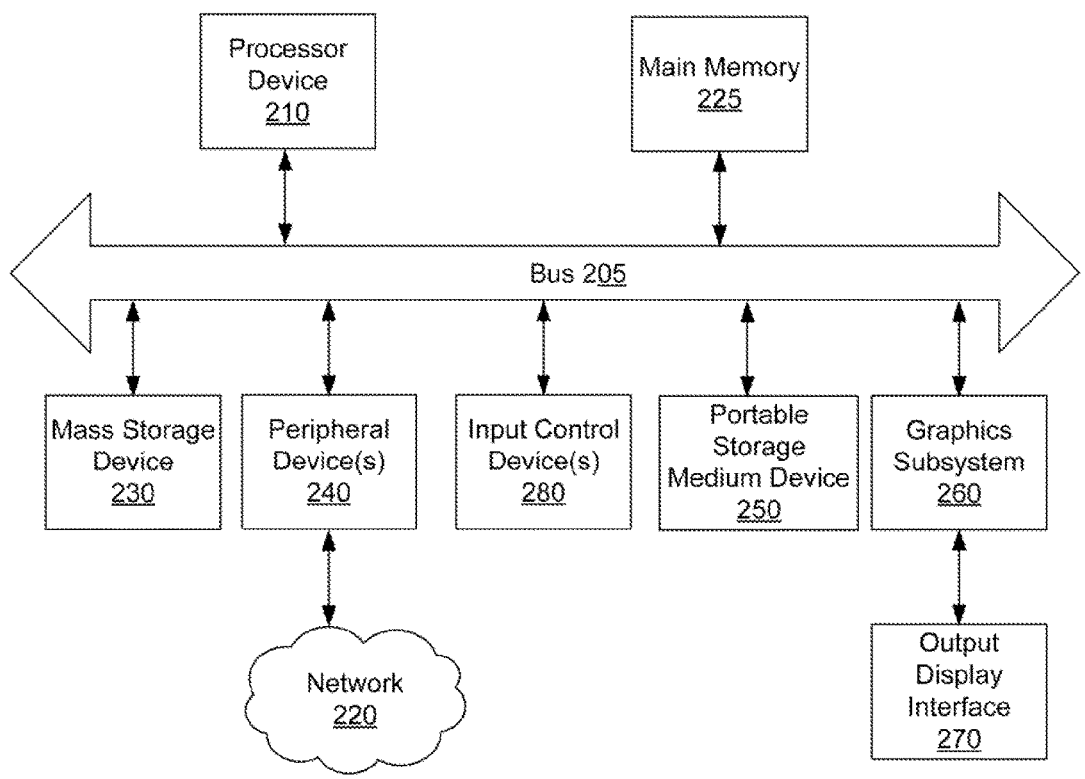
FIG. 2 is a block diagram of an image processing device for use with various example embodiments herein.

FIG. 2 is a block diagram of image processing device 200, which may be a general and/or special purpose computing device, in accordance with some of the example embodiments herein. In some example embodiments, the image processing device 200 further represents the image processing device 102 of FIG. 1. The image processing device 200 may be, for example, a game console, a user device, a user computer, a client computer and/or a server computer, among other things.

The image processing device 200 may include without limitation a processor device 210, a main memory 225, and an interconnect bus 205. The processor device 210 may include without limitation a single microprocessor, or may include a plurality of microprocessors for configuring the image processing device 200 as a multi-processor system. The main memory 225 stores, among other things, instructions and/or data for execution by the processor device 210. The main memory 225 may include banks of dynamic random access memory (DRAM), as well as cache memory.

The image processing device 200 may further include a mass storage device 230, peripheral device(s) 240, portable storage medium device(s) 250, input control device(s) 280, a graphics subsystem 260, and/or an output display interface 270. For explanatory purposes, all components in the image processing device 200 are shown in FIG. 2 as being coupled via the bus 205. However, the image processing device 200 is not so limited. Devices of the image processing device 200 may be coupled via one or more data transport means. For example, the processor device 210 and/or the main memory 225 may be coupled via a local microprocessor bus. The mass storage device 230, peripheral device(s) 240, portable storage medium device(s) 250, and/or graphics subsystem 260 may be coupled via one or more input/output (I/O) buses. The mass storage device 230 may be a nonvolatile storage device for storing data and/or instructions for use by the processor device 210. The mass storage device 230 may be implemented, for example, with a magnetic disk drive or an optical disk drive. In a software embodiment, the mass storage device 230 is configured for loading contents of the mass storage device 230 into the main memory 225.

The portable storage medium device 250 operates in conjunction with a nonvolatile portable storage medium, such as, for example, a compact disc read only memory (CD-ROM), to input and output data and code to and from the image processing device 200. In some embodiments, software for storing image data may be stored on a portable storage medium, and may be inputted into the image processing device 200 via the portable storage medium device 250. The peripheral device(s) 240 may include any type of computer support device, such as, for example, an input/output (I/O) interface configured to add additional functionality to the image processing device 200. For example, the peripheral device(s) 240 may include a network interface card for interfacing the image processing device 200 with a network 220.

The input control device(s) 280 provide a portion of the user interface for a user of the image processing device 200. The input control device(s) 280 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the image processing device 200 may include the graphics subsystem 260 and the output display interface 270. The output display interface 270 may include hardware for interfacing with a cathode ray tube (CRT) display and/or a liquid crystal display (LCD) such as display device 103. The graphics subsystem 260 receives textual and graphical information, and processes the information for output to the output display interface 270.

Each component of the image processing device 200 may represent a broad category of a computer component of a general and/or special purpose computer. Components of the image processing device 200 are not limited to the specific implementations provided here.

IV. Processes

Figure 3:
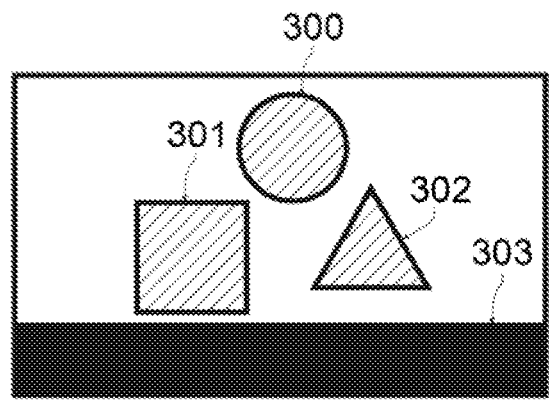
FIG. 3 represents a frame from an alpha overlay video, in accordance with an example embodiment herein.
Figure 4:
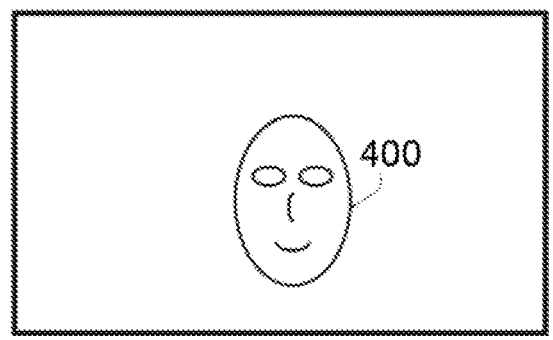
FIG. 4 represents a video frame from a camera showing a user's face as element 400, in accordance with an example embodiment herein.
Figure 5:
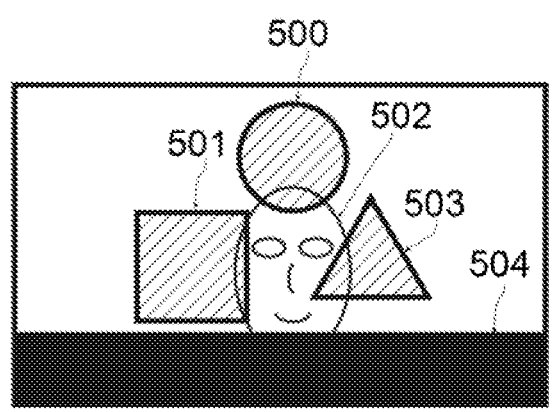
FIG. 5 shows a composite of the alpha overlay video of FIG. 3 with the camera video of FIG. 4, in accordance with an example embodiment herein.

FIGS. 3, 4, and 5 are representative views for explaining the alpha overlay video system. FIG. 3 represents a frame from an alpha overlay video. Elements 300, 301, and 302 represent semi-transparent geometric regions which can be any shape or size. Element 303 represents a completely opaque region, which can also be any shape or size. All of these elements can be animated in any way, including but not limited to changing shape, size, color, and transparency (alpha value).

FIG. 4 represents a video frame from a camera showing a user's face as element 400.

FIG. 5 shows the composite of the alpha overlay video of FIG. 3 with the camera video of FIG. 4. In one example embodiment, the composite shown in FIG. 5 is obtained, at least in part, by executing the example pseudocode provided below for implementing alpha compositing using an overlay video and camera stream. Elements 500, 501, 502, and 503 represent semi-transparent blended regions and element 504 represents a completely opaque region. The frame from FIG. 5 is then shown on screen as well as saved to disk. Each frame of the alpha overlay video and camera video are processed in this way. In one preferred embodiment, the camera video is saved without compositing of the overlay alpha video where the final composite happens at a later time, whereby the result is written to a single video file. In another preferred embodiment, the composite is performed in real-time and a single file is saved.

A. Alpha Video Overlay

In one example embodiment, an alpha overlay video is composited on top of the live camera stream. A user records a performance and can play back the performance in real-time. The composited stream is then stored.

B. Video Effects

In another example embodiment, the video stream is modified in various ways to improve a user's appearance and mask a user's face.

C. Face Detection for Specialized Compositing

In still another example embodiment, the user's face is detected using standard techniques whereby their eyes, mouth, and so on can be individually composited into the scene.

D. Container Compositing

According to another example, the user's video stream is resized and placed in a container object, such as a car, airplane, spaceship, submarine with windows. The container object can also be animated.

E. Audio Effects

The user's voice is changed in pitch or other characteristic in real-time, in another example embodiment. The changed voice is recorded.

F. Reaction Recording

In a further example aspect, a first user creates a recording then sends to a second user. While the second user watches the first user's recording, their reaction is recorded. The second user's recording is then sent back to the first user.

G. Recording Chain

In another example, a first user creates a recording then sends to a second user. The second user creates a recording which is appended to the first recording. The second user sends to a third user and the process repeats until the last user records their part. The final recording is processed into a single recording from all of the individual recordings.

H. Teleprompter

A teleprompter is rendered to provide the user with dialog and stage direction, in accordance with another example embodiment.

I. Interactive Overlays

In still another example embodiment herein, an overlay responds to movement and facial information in video. Examples of this include but are not limited to changing the size, speed, location and type of overlay based on live video information.

Figure 6:
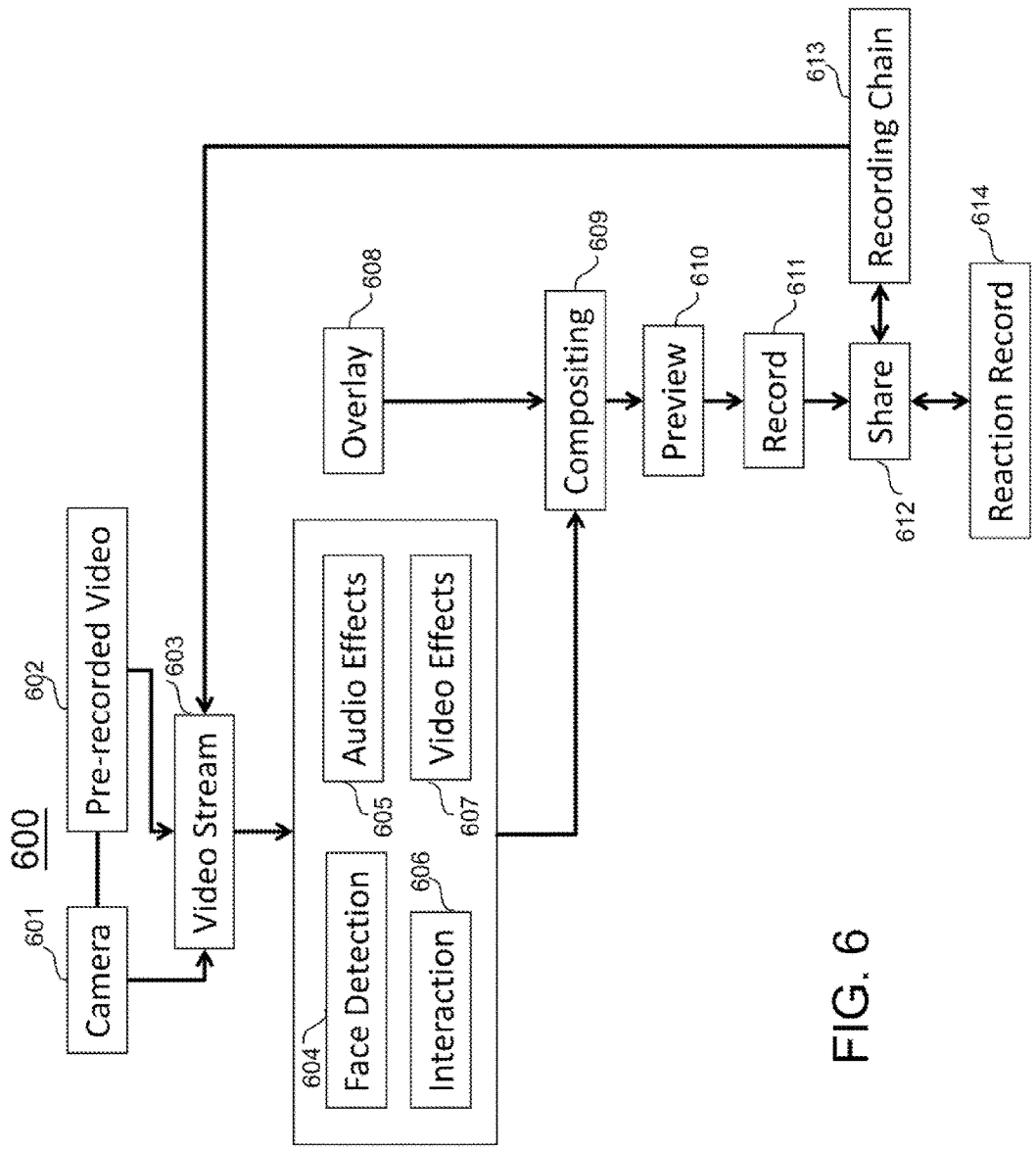
FIG. 6 is a flowchart diagram showing an example procedure for providing audio-video compositing and effects, in accordance with an example embodiment herein.

FIG. 6 is a flowchart diagram showing an example procedure 600 for providing audio-video compositing and effects, in accordance with an example embodiment herein.

At block 603, a video stream is obtained, which may be a live video stream obtained by a camera (block 601) or a pre-recorded video stream (block 602). In some example embodiments, the video stream is obtained by a capture device such as the capture device 101 shown in FIG. 1.

The video stream is then processed according to one or more techniques. For example, at block 604, face detection may be performed on the video stream. At block 605, audio effects (such as, for example, the audio effects described above) may be performed on the audio stream. At block 606, video effects (such as, for example, the video effects described above) may be performed on the video stream. At block 607, the video stream may be processed to be interactive. For example, an overlay (e.g., an overlay alpha video) may be generated at block 608. In one example embodiment, the overlay alpha video may be generated at block 608, at least in part, by executing the example pseudo-code provided below for implementing alpha compositing using an overlay video and camera stream. Then, based on interaction processing performed at block 606, the overlay may be caused to be responsive to movement and facial information in the video stream.

At block 609, the video stream obtained at block 603 and processed at one or more of blocks 604, 605, 606, and 607 is composited with the overlay generated at block 608. The following is example pseudocode for implementing (e.g., in connection with block 608 and block 609) alpha compositing using an overlay video and a camera stream:

```
// *** Alpha Blending an overlay frame on top of a camera
frame ***
struct PixelBGRA { unsigned float b,g,r,a;    }; // RGB
color and alpha (blend factor)
// Image frames sent from video streams, processed one at
a time
PixelBGRA destinationPixels[WIDTH*HEIGHT];
PixelBGRA cameraPixels[WIDTH*HEIGHT];
PixelBGRA overlayPixels[WIDTH*HEIGHT];
inline float lerp(float a,float lo,float hi)    { return lo
+ a*(hi-lo); }
for(int y = 0; y < height; y++) {
   int yw = y*width;
   for(int x = 0; x < width; x++) {
      int i = yw+x;
      PixelBGRA & d = destinationPixels[i];
      PixelBGRA & c = cameraPixels[i];
      PixelBGRA & o = overlayPixels[i];
```

```
// When alpha (o.a) is 0.0, output is 100% camera,
when alpha is 1.0, output is 100% overlay video, when
0.5, 50% each, etc.
    d.b = lerp(o.a,c.b,o.b);
    d.g = lerp(o.a,c.g,o.g);
    d.r = lerp(o.a,c.r,o.r);
  }
}
```

Of course other implementations may also be possible, and this example implementation should not be construed as limiting.

At block 610, a user may preview the video stream obtained at block 603 and processed at one or more of blocks 604, 605, 606, and 607, to check their work.

At block 611, if the user approves of the preview, the video composited at block 609, which consists of the overlay alpha video and the recorded video stream, as well as audio if applicable, is recorded as an audio-video file on a storage device.

At block 612, the audio-video file recorded at block 611 may be shared via email, social media (e.g., Facebook®, Twitter®), and/or by other means.

The audio-video file shared at block 612 can be viewed by a second user (e.g., a viewer) on a desktop personal computer, a laptop computer, a television, a mobile communication device, and/or any other type of computing device.

At block 613, the second user creates a second recording, which is appended to the audio-video file shared at block 612, thereby resulting in a second audio-video file. The second user can then share the second audio-video file with a third user, and so the process may repeat until a final user has appended their recording. The final result is a single audio-video recording consisting of each respective audio-video recording contributed by each user.

At block 614, while the viewer views the audio-video file, their reaction is recorded. The recording of the viewer can then be sent back to the original user.

V. Computer Readable Medium Implementation

The example embodiments described above such as, for example, the systems and procedures depicted in or discussed in connection with FIGS. 1 to 6, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method comprising the steps of:
    pre-recording an overlay video comprising a plurality of frames, each frame of the overlay video comprising at least one pixel represented by one or more color values and an alpha value that is distinct from and not derived from the one or more color values and which governs the transparency or semi-transparency of the at least one pixel;

capturing a live camera stream, also comprising a plurality of frames, of a user, each frame of the live camera stream comprising at least one pixel represented by one or more color values;

in accordance with the transparency or semi-transparency of the alpha value, blending a pixel of the overlay video and a respective pixel of the live camera stream on a frame-by-frame basis to form a composite video, wherein no color or alpha values are compressed by discarding their bits or otherwise; and displaying the composite video, wherein the alpha value is not determined from obtaining a difference between a color or hue source channel and a respective color or hue background channel and comparing said difference to a threshold, and wherein the at least one pixel is part of a region of a frame having the same alpha value.

2. The method of claim 1, further comprising the step of processing the live camera stream with visual effects using one or more filters selected from the group consisting of gamma, color, localized Gaussian blur, bilateral and film grain filters.

3. The method of claim 1, further comprising the steps of capturing audio and processing the audio with audio effects selected from the group consisting of pitch, formant, chorus, flange, vibrato, tremolo, echo, reverb, low pass filter, and high pass filter effects.

4. The method of claim 3, further comprising the step of mixing the captured audio with audio from a soundtrack associated with the overlay video.

5. The method of claim 1, further comprising the steps of resizing the live camera stream and placing the resized stream into a container region, wherein the container region is animated.

6. The method of claim 1, further comprising the steps of detecting and compositing features of the user's face into the composite video individually.

7. The method of claim 1, further comprising the steps of:
storing the composite video to a file; and
sending the file to another person.

8. The method of claim 7, further comprising the step of recording video of the other person's reaction to the composited video, and storing said recorded reaction video into a second file.

9. The method of claim 8, further comprising the step of sending the second file of the recorded reaction video back to the user.

10. The method of claim 7, further comprising the step of the other person appending a second composite video to the composite video to create a story chain video.

11. The method of claim 1, wherein the live camera stream is saved before blending it with the overlay video at a later time.

12. The method of claim 1, wherein the overlay video responds to at least one of movement or facial information of the user in the live camera stream.

13. The method of claim 12, further including the step of changing at least one of size, speed, location or type of the overlay video in accordance with said response.

14. The method of claim 1, wherein the alpha value has a value greater than zero and less than one.

15. The method of claim 1, wherein the alpha value is not based on the live camera stream.

16. The method of claim 1, wherein the pre-recorded overlay video is not real time or near real time.

17. A system for performing image processing, the system comprising:
a recorder for pre-recording an overlay video comprising a plurality of frames, each frame of the overlay video comprising at least one pixel represented by one or more color values and an alpha value that is distinct from and not derived from the one or more color values and which governs the transparency or semi-transparency of the at least one pixel;
a camera for capturing a live camera stream, also comprising a plurality of frames, of a user, each frame of the live camera stream comprising at least one pixel represented by one or more color values;
at least one processor, wherein the processor is configured to blend, in accordance with the transparency or semi-transparency of the alpha value, a pixel of the overlay video and a respective pixel of the live camera stream on a frame-by-frame basis to form a composite video, wherein no color or alpha values are compressed by discarding their bits or otherwise; and
a display for displaying the composite video, wherein the alpha value is not determined from obtaining a difference between a color or hue source channel and a respective color or hue background channel and comparing said difference to a threshold, and wherein the at least one pixel is part of a region of a frame having the same alpha value.

18. The system of claim 17, wherein the live camera stream is processed by said at least one processor with visual effects using one or more filters selected from the group consisting of gamma, color, localized Gaussian blur, bilateral and film grain filters.

19. The system of claim 17, further comprising a microphone for capturing audio, wherein the audio is processed by said at least one processor with audio effects selected from the group consisting of pitch, formant, chorus, flange, vibrato, tremolo, echo, reverb, low pass filter, and high pass filter effects.

20. The system of claim 17, wherein the processor is further configured to resize the live camera stream and place the resized stream into a container region, wherein the container region is animated.

21. The system of claim 17, wherein the processor is further configured to detect and individually composite features of the user's face into the composite video.

22. The system of claim 17, wherein the processor is further configured to:
store the composite video to a file; and
send the file to another person.

23. The system of claim 17, wherein the processor is further configured to save the live camera stream before blending it with the overlay video.

24. The system of claim 17, wherein the alpha value has a value greater than zero and less than one.

25. The system of claim 17, wherein the alpha value is not based on the live camera stream.

26. The system of claim 17, wherein the pre-recorded overlay video is not real time or near real time.

* * * * *